US006514917B1

(12) United States Patent
Smith et al.

(10) Patent No.: US 6,514,917 B1
(45) Date of Patent: Feb. 4, 2003

(54) MOLECULAR TAGS FOR ORGANIC SOLVENT SYSTEMS

(75) Inventors: Michael J. Smith, Newton, PA (US); Bharat Desai, Ringwood, NJ (US); Justin J. Frederico, Fairless Hills, PA (US)

(73) Assignee: United Color Manufacturing, Inc., Newtown, PA (US)

( * ) Notice: Subject to any disclaimer, the term of this patent is extended or adjusted under 35 U.S.C. 154(b) by 0 days.

(21) Appl. No.: 09/588,501

(22) Filed: Jun. 7, 2000

(51) Int. Cl.$^7$ .......................................... C10M 133/28
(52) U.S. Cl. ....................... 508/184; 508/390; 508/421; 508/546; 508/557; 8/521; 8/662; 44/328; 534/558; 534/856
(58) Field of Search ........................... 44/228; 508/390, 508/421, 546, 557, 184; 534/558, 856; 8/521, 662

(56) References Cited

U.S. PATENT DOCUMENTS

| | | | | |
|---|---|---|---|---|
| 3,862,120 A | * | 1/1975 | Orelup | 44/328 |
| 4,009,008 A | * | 2/1977 | Orelup | 44/328 |
| 5,182,372 A | * | 1/1993 | Derber et al. | 534/857 |
| 5,266,227 A | * | 11/1993 | Reichelt et al. | 44/328 |
| 5,428,137 A | * | 6/1995 | Otsuka et al. | 534/792 |
| 5,487,770 A | * | 1/1996 | Dyllick-Brenzinger et al. | 44/328 |
| 5,490,872 A | * | 2/1996 | Friswell et al. | 44/328 |
| 5,827,332 A | * | 10/1998 | Zeidler et al. | 44/328 |
| 6,083,285 A | * | 7/2000 | Friswell et al. | 8/521 |
| 6,274,381 B1 | * | 8/2001 | Pauls et al. | 436/56 |
| 6,339,145 B1 | * | 1/2002 | Traverso | 534/857 |

* cited by examiner

Primary Examiner—Jacqueline V. Howard
(74) Attorney, Agent, or Firm—John N. Coulby; Jamie M. Larmann; Collier Shannon Scott, PLLC

(57) ABSTRACT

Colorless markers for petroleum products and methods and composition for detecting them.

34 Claims, No Drawings

MOLECULAR TAGS FOR ORGANIC SOLVENT SYSTEMS

BACKGROUND OF THE INVENTION

In the present invention, novel chromogenic chemical substances are disclosed as molecular tags for organic solvent solutions, especially petroleum products. A method of synthesizing, detecting and quantifying these new substances is also disclosed. The detection methods provides a novel and improved technique for detecting and quantifying some known marker substances. With the present invention, color or fluorescence is developed in a single phase system containing the petroleum product, without need of a separate extraction step.

Proton accepting chemical substances, that at a solution concentration of below about 20 milligrams per litre, impart little or no significant color to organic solvents, have been proposed as markers, or taggants, especially for petroleum-derived fuels, on many occasions. The marker is dissolved in a liquid to be identified, then subsequently detected by performing a simple physical or chemical test on the marked liquid. Markers are sometimes employed by government agencies to ensure that the appropriate tax has been paid on particular grades of fuel. Oil companies also mark their products to help assist in identifying those who have diluted or altered their products. These companies often go to great expense to make sure their branded petroleum products meet certain specifications, for example, volatility and octane number, as well as to provide their petroleum products with effective additive packages containing detergents and other components. Consumers rely upon the product names and quality designations to assure that the product being purchased is the quality desired.

Traditionally, the presence of these substances is detected and optionally quantified by extracting the fuel with an immiscible aqueous or significantly aqueous solution of an acid substance, the precise nature of which can be varied according to the characteristics of the marker substance. The acid reacts with the basic compound to produce a readily visible, more or less intensely colored cation, that is dissolved in the aqueous acid phase. This technique is illustrated in the disclosure of U.S. Pat. No. 5,145,573.

The quantity of marker substance in the extract may also be measured, for instance, by visible light absorption spectrophotometry, the results of which are then compared with a reference standard to determine the original concentration of basic marker in the fuel. It is sometimes necessary to make repeated, typically two or three, extractions of the fuel to recover all the marker originally present in order for complete quantification. Consequently, it is also relatively simple to remove the marker from the marked fuel by this reaction. This is a shortcoming of these prior art basic marker substances; they are relatively easy to remove from fuels by unscrupulous parties who may wish to defraud tax authorities, or individual consumers. For instance, marked low octane gasoline may be laundered to remove the marker enabling fuel to be resold as unmarked, higher price premium fuel. Alternatively, marked #2 fuel oil, sold tax free as home heating oil or railroad or agricultural diesel fuel, may have the marker removed from it in order to resell it at the much higher price of taxed, on road, diesel engine fuel. The lawful tax collection agencies are thereby deprived of their revenues. In the United States, such revenues have increased by about 2 billion dollars since implementing a marker program in 1993.

Additionally, the extracted, separated phase is classifiable as a hazardous waste and presents problems of safe and lawful disposal, especially when examinations are made "in the field." Furthermore, the fuel with which it was in contact may be water wet, making return to its original source undesirable and thus presenting an additional waste disposal problem. By using a developing agent of the present invention, especially hydrocarbon or alcoholic solutions of an organic phosphoric or sulfonic acid, the indicative color or fluorescence of the marker can be made plainly and instantly visible and can be quantified without extraction from the petroleum product.

The rapidity and certainty of the test procedure is very important in field testing to minimize delaying trucks and wrongful impoundment of vehicles. Isotopic labeling can also be useful as a secondary analytical procedure to confirm, independently, results already obtained by chromogenic analysis.

SUMMARY OF INVENTION

The present invention provides compositions comprising a petroleum product, which forms an organic phase, a marker substance dissolved in the petroleum product, and a non-aqueous acid combined with the marker substance in the organic phase to develop a detectable color. It also includes compositions comprising a petroleum product, which forms an organic phase, a marker substance dissolved in the petroleum product, and an acid combined with the marker substance and petroleum product to develop a detectable color or fluorescence in the organic phase.

Markers for petroleum products are also provided. They have the following structure:

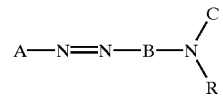

where A, B, and C, independently of each other, are aromatic carbocyclic moeities, N is nitrogen and R is an alkyl group or hydrogen atom. Further, the present invention provides methods of identifying a petroleum product containing an acid reactable marker by first obtaining a sample of petroleum product containing an acid reactable marker, and then adding to that sample a developing agent comprising a non-aqueous acid or solution to form a single phase in which the acid and marker combine to develop a detectable color.

DESCRIPTION OF THE INVENTION

The present invention provides novel molecular taggants or markers and developing agents for use with them. The developing agents may also be used with preexisting markers that react with an acid. The markers are essentially invisible in liquid petroleum products at an effective level of use but provide a distinctive color and/or fluorescence when contacted by an appropriate developing agent of the present invention. The procedure of the present invention for developing color or fluorescence is simple to perform in the field and the reagents used to develop the color are easy to handle and recycle.

With the present invention, the procedure for detecting and quantifying acid reactive markers, for petroleum-derived compositions, can take place directly in the petroleum product without extraction of an aqueous phase. This reaction is accomplished preferably with a non-aqueous organic acid solution that is miscible with that petroleum product. This combination produces an instant visual or, if desired, instrumental indication of the presence of the marker substance. The marker concentration may be determined accurately by, for instance, standard spectrophotometric procedures. The procedure of the present invention is faster and more convenient than use of aqueous acid extractions to produce a quantitative result and an extended time period to yield complete phase separations. The new procedure also reduces potential environmental disposal problems since the developed, marked product may be returned to its origin; optionally, with neutralization of the acid developer, with, for instance, an aliphatic amine that is miscible with the said petroleum product. It also permits the use of acid reactable marker substances that do not readily extract from the petroleum product under aqueous acid conditions.

Developing reagents of the present invention are symbolized generally by R—OH where the OH group is part of an acid moeity with a $pK_a$ value of 3.5 or less and R is a mono alkyl or aryl sulfonic acid moeity or a mono alkyl or dialkyl phosphoric acid.

The preferred acids for marker development are those which are fully miscible with the petroleum product. In addition, for quantitative analysis the salt they develop, by reaction with the marker substance, should also be completely soluble in the fuel.

The final choice of acid can vary from one system to another according to solubility parameters. For instance, high octane gasolines frequently contain a substantial amount of aromatic hydrocarbons that have good solvency power for the marker substance and developer. Conversely, kerosene fuel and lubricating oils are substantially aliphatic and/or alicyclic in nature and have comparatively poor solvency properties for many marker substances and their salts derived from reaction with acids.

Although organic sulfonic acids like methane sulfonic acid can be used, acids with a more complex organic function are desirable for miscibility purposes. Especially preferred are higher alkylated benzene sulfonic acids, in particular the $C_{10}$–$C_{20}$ alkyl substituted benzene sulfonic acids of which dodecylbenzene sulfonic acid is the most convenient of all. This compound is manufactured extensively as the basis of many laundry and other detergents. The dodecyl chain may be either linear or branched, linear compounds are preferred since they biodegrade more readily, both are completely effective in our invention.

As an alternative to the sulfonic acids, mono or di alkyl or aryl esters of phosphoric acid may be used as developer or detector reagents. Many such compounds are available industrially and, as with the organic sulfonic acids, the final choice depends upon the compatibility of the particular fuel with the system being tested. One compound that has a wide spectrum of compatibility, and is especially preferred, is the di (2 ethylhexyl) ester of phosphoric acid.

The quantity of developer to be used in the detection procedure is at least one molar equivalent per mole of marker substance and preferably 2–5 times excess. The acid developer is preferably added in the form of a dilute solution in a hydrocarbon, alcohol or glycol ether. The reason for this is that the marker substance will be at a concentration of 100 mg/L or less in the petroleum product and the molar amount of the developer acid to be used will be very small and inconvenient to add as an undiluted substance. For a gasoline fuel, a fairly volatile solvent, such as toluene, xylene, ethanol or n-propanol is recommended. For less volatile fuels like kerosene, 2 ethyl hexanol or I dodecane may be preferred due to their greater compatibility with this type of system. These solvents are also suitable for use with lube oils and greases. In the latter case, the concentration of dodecylbenzene sulfonic acid may have to be radically increased due to the presence of other bases, especially inorganic compounds like lithium hydroxide, in greases. Generally speaking, the ratio of acid to marker substance may be varied over a broad range of concentrations to optimize marker development in different systems. The concentration of acid used in the present method is typically much less than the aqueous or aqueous alcoholic developer/ extractants specified in the prior art.

The activity level of the acid in our invention can be 0.05 molar or even less. This contrasts with a recommended concentration of 2.5–3.0 molar acid used in extraction procedures. Consequently, our developing reagent is less corrosive and potentially much less hazardous to handle than prior art recommendations, especially in field test situations.

Suitable solvents for the acid developer include aliphatic and aromatic hydrocarbons, alcohols, glycols and glycol ethers. The lower alcohols, such as methanol, ethanol and propanol are convenient for this purpose, particularly when the petroleum product is gasoline but most preferred are hydrocarbons like toluene or xylene. For use with other petroleum products, for instance use in conjunction with marked diesel fuels, a less volatile solvent is preferred. Generally, the higher aliphatic and aromatic hydrocarbons are particularly valuable in this respect and especially isooctane, dodecane and other aliphatic hydrocarbons which present a desirable combination of properties including good solvency power and miscibility with petroleum fuels, low vapor pressure at ambient temperatures, high flash points and non mutagenicity. This combination minimizes human health and fire hazards.

The concentration of the acids in solutions of the present invention may be varied over a wide range. It is preferred that enough acid is present to react with all the marker in the fuel sample. For practical reasons a solution of about 0–5–10%, preferably about1%, of acid in solvent is considered desirable for commercial purposes. A solvent will therefore ordinarily make up about 90–99% of the non-aqueous developer solution.

Developing reagents of the present invention may be used, for instance, with either the novel marker substances of this invention or prior art markers such as Solvent Yellow 56 or Solvent Yellow 124.

The preferred novel taggants or marker substances of the invention are aromatic carbocyclic monoazo compounds symbolized by the following generic structure:

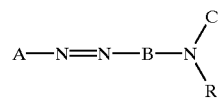

Where A, B and C are aromatic carbocyclic moeities, preferably benzene or naphthalene, N represents nitrogen atoms and R is an alkyl group or hydrogen atom. R is preferably branched or unbranched $C_1$–$C_{20}$.

Hydrogen atoms attached to units A, B and C may be substituted, optionally, by one or more other atoms or groupings that do no impart appreciable water solubility to the molecule. Typical substituents may be halogen atoms, nitro, alkyl, alkoxy or hydroxy groups, carboxylic esters, carboxamide or sulfonamide functions. Especially useful are substituents like alkyl groups, that enhance solubility of the basic marker substance in organic solvents, particularly the aliphatic hydrocarbons that predominate in many petroleum fuels. Also, where the marker substance is intended to be combusted as part of a fuel, it is very desirable to confine its composition to carbon, hydrogen, nitrogen and oxygen atoms in order to avoid the emission of possible atmospheric pollutants such as sulfur oxides and hydrogen halides.

The monoazo marker compounds of the invention can be prepared by conventional techniques involving either the diazotization of a preferred carbocyclic primary aromatic amine followed by azo coupling to an N arylamino benzeneamine or N aryl naphthaleneamine which is free to undergo azo coupling in the 4 position of the aromatic nucleus with respect to the N aryl amino substituent at position 1.

For practical and economic reasons the preferred primary amines are aniline and its ring alkylated derivatives, especially dodecylaniline. Also valuable are the esters of aminobenzoic acids, the primary function of the ester grouping being to enhance the solubility of the marker substance in hydrocarbon solvents, particularly the aliphatic, naphthenic and alicyclic hydrocarbons that are the major components of gasoline, diesel, home heating and lubricating oils and kerosene.

Alternatively, the preferred compounds of the invention may be synthesized by the diazotization of a 4 amino diphenylamine followed by its azo coupling to a phenol or substituted phenol. Of especial value as coupling components are alkyl phenols whereby the appropriate choice of an alkyl group ensures that the resulting compound has good solubility in the aforementioned aliphatic naphtheneic and alicyclic hydrocarbon solvents.

The following examples serve to illustrate, but do no limit, the scope of the invention.

EXAMPLE 1

A stirred one liter glass flask is charged with 50 grams of ice followed by 28.1 grams of 32% hydrochloric acid. 26.1 grams of dodecyl aniline in 50 ml of xylene is added dropwise while stirring the mixture at 0 C. Next 17.25 grams of sodium nitrite at 40% is added while the temperature is maintained below 5° C. After a positive sulfone test is maintained for ten minutes, sulphamic acid is added to remove excess sodium nitrite. 16.9 grams of diphenylamine in 50 ml of xylene is poured into the reaction and stirred. The pH is adjusted to 3 by the addition of sodium formate. After coupling is complete the reaction is neutralized with ammonia and let stand. The water is removed and the solvent evaporated to provide 88.8% crude product. A 10 mg/L$^{-1}$ of the substance dissolved in the xylene turned to a bright violet when reacted with dodecylbenzene sulfonic acid, with an absorption maximum at 561 nanometers (nm).

EXAMPLE 2

A stirred one liter glass flask is charged with 50 grams of ice followed by 28.1 grams of 32% hydrochloric acid. 26.1 grams of dodecyl aniline in 50 ml of xylene is added dropwise while stirring the mixture at 0 C. Next 17.25 grams of sodium nitrite at 40% is added while the temperature is maintained below 5° C. After a positive sulfone test is maintained for ten minutes, sulphamic acid is added to remove excess sodium nitrite. 18.3 grams of N-methyl diphenyl amine in 50 ml of xylene is poured into the reaction and stirred. The pH is adjusted to 3 by the addition of sodium formate. After coupling is complete the reaction is neutralized with ammonia and let stand. The water is removed and solvent evaporated to provide 92.1% crude product. This dye is very similar to that of example 1 except that it develops to a slightly redder violet with an absorption maximum of 559 nm.

EXAMPLE 3

A stirred two liter glass flask is charged with 12 ml of 45% sodium hydroxide and 200 ml of water followed by 20.6 grams of di-secbutyl phenol. The vessel is heated to 70 C and then cooled to 50 C. A separate one liter flask is charged with, 200 ml of water, 28.1 grams of 32% hydrochloric acid, and 18.4 grams of 4-amino diphenyl amine base followed by heating. Once the amino diphenylamine is transformed into its hydrochloride salt, the mixture is cooled to 10 C and 17.25 grams of sodium nitrite at 40% is added. After a positive sulfone test is maintained for ten minutes, sulphamic acid is added to remove excess sodium nitrite. The diphenylamine diazo solution is stirred into the di-secbutylphenol solution while a pH of above 12 is maintained. After coupling is complete the solution is acidified to pH of 3 by addition of acetic acid. Next the pH of the heterogeneous solution is adjusted to 6.5. The water is removed and the solvent evaporated to provide 93.0% crude product a 10 mg/L$^{-1}$ solution of the product turned to a reddish blue with a maximum absorption at 588 nanometers when it was reacted with di 2 ethlhexyl-phosphoric acid

| Example No. | Diazo Component | Coupling Component | Protonated Visual Appearance | Absorption Maximum NM |
|---|---|---|---|---|
| 4 | Dodecylaniline | 1 Phenylamino Naphthalene | Blue | 616 |
| 5 | Dodecylaniline | 3 methyl diphenylamine | Violet | 559 |
| 6 | 2 amino butylbenzoate | Diphenyl-amine | Red | 543 |
| 7 | 4 amino butylbenzoate | Diphenyl-amine | Bluish Red | 549 |
| 8 | 4 amino diphenylamine | 4 nonyl phenol | Violet Blue | 599 |

In addition to the aforementioned novel azo marker substances, other basic organic compounds, recommended in the prior art as fuel markers, may also be usefully detected and quantified by the inventive technique, even though they have previously only been recommended for detection etc. by extraction with aqueous or significantly aqueous protogenic reagents. Of especial interest are the usually colorless or feebly colored bases of triaryl methane, xanthene, azine and other related dyes. These bases protonate to form intensely colored ammonium, oxonium and carbocations. Readily available substances include triaryl methane carbinols like Methyl Violet Base, triaryl methane lactones like Crystal Violet lactone and Rhodamine B Base and amines like the Victoria Blue bases and Nile Red A. These compounds present at concentrations of 0.1 to 200 mg/L$_{-1}$ in organic solvents but preferably 1 to 20 mg/L$^{-1}$ may be reacted with non-aqueous acids or essentially non-aqueous solutions of same to produce intensely colored cations that absorb light in the visible spectrum at wavelengths well removed from those which may cause a fuel or lube oil to have a visual yellow to brown color. In case of very dark fuels, etc. quantification of the marker substance may be enhanced by processing a linear absorption spectrum by a derivative, especially second derivative, technique.

EXAMPLE 9

An aliquot of a dilute solution of Rhodamine B base, C.I. Solvent Red 49, in Phenol glycol ether, is added to water white #1 kerosene lamp oil to produce a colorless 2 mg/L$^{-1}$ solution of the Rhodamine B base. 100 mls of the fuel has added it to 10 mls of 1% solution of technical grade Dodecylbenzene sulfonic acid in Dodecane. An immediate intense fluorescent pink color is produced with an absorption maximum of 545 nanometers (nm) and an emission maximum at 565 nm. An unknown concentration of Rhodamine B base in a fuel may be quantified by comparison to a calibrated reference standard. When only very low concentrations of Rhodamine are present, or the fuel has a high background color, detection and quantification may be achieved more easily by spectrofluorimetry than by spectrophotometry.

EXAMPLE 10

One liter of unleaded gasoline is added to 10 mls of a 0.1% solution of Methyl Violet base, dissolved in denatured ethanol. This marks it with the dye base at a concentration of 10 mg/L$^{-1}$. 100 mils of the marked gasoline is mixed well with 900 mls of unmarked premium gasoline. 100 mls of this mixture then has added to it 10 mls of a 1% solution if diethylhexyl phosphoric acid in xylene. An immediate violet color develops which can be quantified spectrophotometrically to confirm a concentration of 1 mg/L$^{-1}$ marker in the diluted gasoline. If 1 ml of N,N dimethylethanolamine is added to the violet colored developed gasoline, the color is discharged and the fuel regains its previous appearance.

EXAMPLE 11

The procedure described in Example A is repeated, except that a 1% solution of 1,1,1 trichloro acetic acid is substituted for the di 2 ethylhexyl-phosphoric acid. Identical qualification of the Methyl Violet marker substance is obtained.

EXAMPLE 12

One liter of #2 home heating oil, already colored at a concentration of 26 mg/L$^{-1}$ with Unisol® Liquid Read BNM, according to United States IRS regulations, is marked with Victoria Blue B base at a concentration of 5 mg/L$^{-1}$. To 100 mls of the marked heating oil is added 10 mls of a 1% solution of dodecylbenzene sulfonic acid in 2 ethylheranol. The fuel immediately turns from red to purple in appearance. If a sample of the developed fuel is scanned in an absorption spectrophotometer, the relative concentrations of red and blue may be measured.

EXAMPLE 13

If the Victoria Blue B base instanced in Example C is replaced by the same concentration of the azo compound synthesized according to example 1, a similar quantification of the red dye and marker are obtained.

EXAMPLE 14

100 mls of home heating oil colored with 4 mg/L of C.I. Solvent Red 164 and 11 mg/L of C.I. Solvent Yellow 124, according to the regulations of the Province of Ontario, Canada, has added to it 10 mls of a 1% solution of dodecylbenzene sulfonic acid. The appearance of the fuel immediately changes from a weak reddish orange to a more intense red shade, due to the conversion of the Solvent Yellow 124 base to a magenta red cation. If a sample of the developed fuel is scanned in an absorption spectrophotometer and the results processed by a second derivative or multiple components, the concentration of the Solvent Red 164 and the Solvent Yellow 124 in the original fuel may be quantified. This detection procedure is much faster and move convenient than the existing technique involving 2 or 3 consecutive extractions of the fuel sample with aqueous hydrochloric acid, since after individually separating each extract they have to be combined, then possibly filtered, to remove entrained droplets of fuel, before they can be assayed spectrophotometrically.

EXAMPLE 15

A sample of a proposed fuel marker conforming to Example 6 of WO99/67346 was synthesized by azo coupling diazotized dodecylaniline with N,N diethyl m-toluidine. The procedure for detecting the marker substance involves extraction of fuel containing it with a mixture of equal parts by volume of 10N aqueous hydrochloric acid and ethyl alcohol. The same marker substance may be detected with less handling hazard and more convenience by reacting it with an anhydrous solution of dodecylbenzene sulfonic acid as described in Example 10 above.

EXAMPLE 16

Diazotized aniline was azo coupled with the butyric acid ester of N-phenyl-N-ethyl ethanolamine as in Example 2 of U.S. Pat. No. 5,737,871 to produce a proposed fuel marker. According to claim 6 of the same patent, the presence of the substance in the fuel is detected by extraction with an acidic aqueous solution. The substance can also be reacted directly in the fuel with an anhydrous acid in the present invention to instantly detect and quantify it. This is more convenient, less time consuming, and less hazardous than extraction with aqueous acid.

Applicant's invention has been described with reference to preferred embodiments. Numerous modifications to the described invention may be made without departing from the scope of the invention.

EXAMPLE 17

A sample of 4 amino N 2' ethylhexylbenzene sulfonamide was diazotized and azo coupled to NN diethylaniline. The products is a yellow crystalline solid readily soluble in most hydrocarbons. A 10 mg/L solution in uncolored gasoline developed to a clear red hue upon reaction with a dilute solution of dodecylbenzene sulfonic acid.

Markers useful in the present invention are also represented by the following formula:

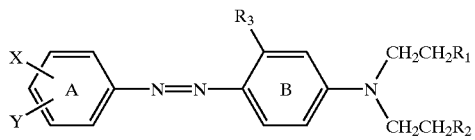

Wherein any of the hydrogen atoms of the molecule symbolized above may be replaced by deuterium atoms. Ring A may contain up from zero to two substituents, X and Y, which represents any grouping that does not impart significant water solubility to the molecule. X and Y may, for instance, be (independently of each other) halogen atoms, nitro groups, more preferably, alkyl and alkoxy groups or the esters or amides of carboxylic acid groups. Also useful are N alkyl sulfonamide groups. $R_1$ and $R_2$ may be a hydrogen or deuterium atoms or a substituted hydroxy group, especially a group that forms part of an ester function derived from an alkyl carboxylic acid or part of an actual function derived by reaction with an alkyl vinyl ether. $R_3$ is an alkyl, alkoxy, or acylamino group.

In another embodiment, markers of the present invention may be added to petroleum products that also contain a dye. The marker substance may be developed in a sample of the petroleum product with an acid, as described above, without a separate extraction step. In otherwords, the presence of a dye does not interfer with development and detection of a marker substances in accordance with present invention. Dyes that may be used in addition to marker substances, include C.I. Solvent Red 23 and its ring alkylated homologues may also be used in the present invention. Ring alkylated homologues of C.I. Solvent Red 23 include C.I. Solvent Reds, 24, 25, 26, 27, 164 and 164:1. C.I. Solvent Yellow 124 may also be used in the present invention.

What is claimed is:

1. A composition comprising:
   a) a petroleum product which forms an organic phase;
   b) a marker substance dissolved in said petroleum product; and
   c) a non-aqueous acid combined with said marker substance in said organic phase to develop a detectable color.

2. A composition as recited in claim 1 wherein said acid is selected from the group consisting of alkyl, aryl and organic sulfonic acids.

3. A composition as recited in claim 2 wherein said acid is dodecylbenzene sulfonic acid.

4. A composition as recited in claim 1 wherein said acid is selected from the group consisting of alkyl and dialkyl phosphoric acids.

5. A composition as recited in claim 1 where said acid is applied as a solution in an organic solvent.

6. A composition as recited in claim 5 where the solvent is an aliphatic or aromatic hydrocarbon or alcohol.

7. A composition as recited in claim 1 wherein said marker substance is:

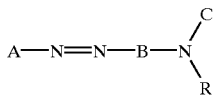

wherein A, B, and C, independently of each other, are aromatic carbocyclic moeities, N is nitrogen and R is an alkyl group or hydrogen atom.

8. A composition as recited in claim 7 wherein A, B, and C are selected, independently of each other, from the group consisting of benzene and naphthalene.

9. A composition as recited in claim 8 wherein R is branched or unbranched $C_1$–$C_{20}$ alkyl group.

10. A composition as recited in claim 8 wherein hydrogen atoms attached to rings A, B and C is substituted, by one or more other atoms or groups that do not impart appreciable water solubility to the molecule.

11. A composition as recited in claim 10 wherein Ring A is substituted with a component selected from the group consisting of halogen atoms, nitro, alkyl, alkoxy or hydroxy groups, carboxylic esters, carboxamide or sulfonamide groups.

12. A marker composition as recited in claim 1 wherein the marker is:

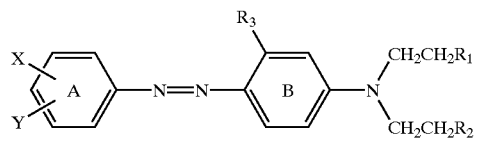

wherein any of the hydrogen atoms may be replaced by deuterium atoms; Ring A contains zero to two substituents, X and Y, wherein X and Y are any substituent that does not impart significant water solubility to the molecule; N alkyl sulfonamide groups. $R_1$ and $R_2$, independently of each other, hydrogen, deuterium or a substituted hydroxy group; and $R_3$ is an alkyl, alkoxy, or acylamino group.

13. A composition as recited in claim 12 wherein said marker substance is N,N diethyl aminoazobenzene.

14. A composition as recited in claim 12 wherein substituents on said substituted hydroxy groups form part of an acetal structure obtained by reaction of said group with an alkyl vinyl ether.

15. A composition as recited in claim 12 wherein substituents on said substituted hydroxy,group form part of an ester structure obtained by reaction of said group with an alkyl carboxylic acid, its halide or anhydricle.

16. A composition as recited in claim 14 where the alkyl vinyl ether is isobutyl vinyl ether and said substance is C.I. Solvent Yellow 124.

17. A composition as recited in claim 12 wherein $R_1$ and $R_2$ are hydrogen atoms.

18. A composition as recited in claim 12 wherein one or more of the hydrogen atoms is replaced by a deuterium atoms.

19. A composition as recited in claim 1 wherein said petroleum product further contains a dye in addition to said marker substance.

20. A composition as recited in claim 19 where said dye is an 1,4 alkyl or substituted alkylamino anthraquinone compound.

21. A composition as recited in claim 19 where said dye is an alkyl derivative of phenyl azo phenyl azo 2 amino naphthalene.

22. A composition as recited in claim 19 where said dye is C.I. Solvent Red 23 and its ring alkylated homologues.

23. A composition comprising:
   a) a petroleum product which forms an organic phase;
   b) a marker substance dissolved in said petroleum product; and
   c) an acid having a pKa value not more than 3.5 combined with said marker substance in said organic phase to develop a detectable color.

24. A composition comprising:
   a) a petroleum product which forms an organic phase;
   b) a marker substance dissolved in said petroleum product; and
   c) an organic acid combined with said marker substance and petroleum product to develop a detectable color or fluorescence in said organic phase.

25. A marker for petroleum products of the following structure:

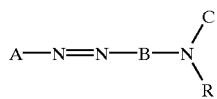

wherein A, B, and C, independently of each other, are aromatic carbocyclic moeities, N is nitrogen and R is an alkyl group or hydrogen atom.

26. A marker as recited in claim 25 wherein A, B, and C are selected, independently of each other, from the group consisting of benzene and naphthalene.

27. A marker as recited in claim 26 wherein R is branched or unbranched $C_1$–$C_{20}$ alkyl group.

28. A marker as recited in claim 27 wherein hydrogen atoms attached to rings A, B and C is substituted, by one or more other atoms or groups that do not impart appreciable water solubility to the molecule.

29. A marker as recited in claim 28 wherein said one or more other atoms or groups are selected from the group consisting of halogen atoms, nitro, alkyl, alkoxy or hydroxy groups, carboxylic esters, carboxamide or sulfonamide groups.

30. A method of identifying a petroleum product containing an acid reactable marker comprising:

a) obtaining a sample of petroleum product containing an acid reactable marker;

b) adding to said sample a developing agent comprising a non-aqueous acid or solution to form a single phase in which said acid and marker combine to develop a detectable color c) detecting said color.

31. A method as recited in claim 30 wherein said marker is detected and quantified with a spetrophotometer.

32. A method as recited in claim 31 where said marker is fluorescent and detected and quantified by means of a spectrofluorimeter.

33. A method as recited in claim 32 wherein said marker is detected and quantified with a spectrofluorimeter.

34. A method as recited in claim 33 wherein said marker is istopically labeled and said isotope is detected.

* * * * *